United States Patent Office 3,223,731
Patented Dec. 14, 1965

3,223,731
RECOVERY OF DIACID AND DIAMINE COMPONENTS OF POLYAMIDE HYDROLYZATES
John Thorburn Craig, Linden, Wellington, New Zealand, assignor to Imperial Chemical Industries Limited, London, England, a corporation of Great Britain
No Drawing. Filed Sept. 4, 1962, Ser. No. 221,345
Claims priority, application Great Britain, Sept. 12, 1961, 32,715/61
8 Claims. (Cl. 260—537)

This invention relates to the hydrolysis of nylon polyamides formed from diacids and diamines to recover the constituents of such polyamides.

During the manufacture of nylon from diacids and diamines a considerable amount of waste material is produced which is unsuitable for fibre manufacture or other uses. These diacids and diamines are costly and in consequence a satisfactory method of recovering them from waste nylon is of great value.

According to the present invention, there is provided a process for the recovery of constituent diamines and diacids from nylon which comprises hydrolysing the nylon under pressure preferably in an inert atmosphere at a temperature of at least 160° C. in the presence of an aqueous solution containing at least 20% excess equivalents of an alkali metal hydroxide, extracting the diamine from the hydrolysis product with an organic solvent, separating the solvent solution of diamine from the residual aqueous solution of diacid salt, and recovering the diamine and diacid from the solvent solution and aqueous solution respectively.

The term "20% excess equivalents of alkali metal hydroxide" means that for each proportion of diacid which is present in the polyamide a proportion of alkali metal hydroxide is used which is 20% in excess of that required to form the corresponding alkali metal salt of the diacid. It is usual to employ about 50% excess equivalents of alkali in the process of the invention, but if desired up to about 100% excess equivalents may be employed. Especially suitable alkali metal hydroxides are sodium and potassium hydroxides. Sufficient water is usually employed in the hydrolysis to prevent separation of diacid salt from solution.

Preferred temperatures for conducting the hydrolysis are from about 185° C. to 195° C. but any temperature from about 160° C. to about 220° C. is usually satisfactory. Below 160° C. hydrolysis proceeds very slowly and above 220° C. there is a risk of decomposing the polyamide and its hydrolysis products (i.e., at the temperature of decomposition). It is desirable to conduct the hydrolysis substantially in absence of oxygen, and it is usually performed in a nitrogen atmosphere. Superatmospheric pressures are employed but it is unnecessary to exceed a pressure of about 15 atmospheres.

The aqueous hydrolysis product is usually cooled to a temperature below the boiling point of the organic solvent employed for extraction of the diamine constituent. Usually from about 0.1 part to about 1 part of solvent per part of aqueous hydrolysis product are employed. The extraction may be performed continuously or discontinuously.

The organic solvent used to extract the diamine is selected so as to be capable of forming a two phase system when added to the aqueous hydrolysis product. The solvent preferably has a boiling point sufficiently remote from that of the diamine to permit of separation by distillation. Especially suitable solvents for extracting the diamine are aliphatic alcohols containing from 3 to 8 carbon atoms, for example propyl, butyl and amyl alcohols. Other suitable solvents are cyclo aliphatic alcohols such as cyclohexanol.

After extraction of the diamine from the hydrolysis product the aqueous residue containing the diacid salt may be acidified in order to liberate the free diacid.

The process of the present invention may be employed with any linear condensation polymer derived from a diacid and a diamine for example any of these mentioned in United States Patent Specifications Nos. 2,130,523 and 2,130,948, such as the aliphatic and aromatic diamines and aliphatic and aromatic dicarboxylic acids.

The invention is illustrated but not limited by the following examples in which parts and percentages are by weight.

*Example 1*

Water (600 parts), sodium hydroxide (120 parts) and polyhexamethylene adipamide (220 parts) are added to a 4 litre stainless steel autoclave. Under an atmosphere of nitrogen and with constant agitation, the charge is heated at 190° C. for 3 hours, then cooled to 100° C. and discharged as a clear, light brown solution.

This solution is cooled to 40° C. then extracted with n-butanol containing 20% water, in five portions each of 105 parts. The alcoholic extracts are combined and the n-butanol distilled off at atmospheric pressure through a fractionating column. Distillation is stopped when the temperature in the still head rises above 120° then the column is washed down with a small amount of water, the washings being returned to the residue in the distillation flask. This material was then distilled at a pressure equivalent to 60 mm. mercury, without any separation of the fractions. (The fraction corresponding with hexamethylene diamine boils at 122–124° C. at this pressure.) The distillate consists of an aqueous solution of the diamine, the concentration of which is estimated by titration. The yield is 93.1%.

After extraction with n-butanol, the aqueous layer is acidified (to pH 1) by the addition of 50% sulphuric acid, giving a precipitate of adipic acid which is filtered off at 25° C. washed with 120 parts of water in two equal portions and dried at 110° C. The crude adipic acid is recrystallised from twice its own weight of water. The yield is 90.2% and the quality is sufficiently high for it to be used in the synthesis of adiponitrile.

The recovery of butanol saturated with water from the fractionation of the alcoholic extract is 91%. Removal of n-butanol as its aqueous azeotrope from the crude adipic acid mother liquor gives a further 1.8%.

*Example 2*

The solution obtained from the autoclave, as described in Example 1 is extracted with 515 parts of a mixture of isopropanel (75%) and water (25%) in five equal portions. The alcoholic extracts are combined, and the isopropanol/water azeotrope is distilled off through a fractionating column at 80–81° C. Distillation is stopped when the temperature in the still-head reaches 86° C. and the fractionating column is washed down with water, the washings being added to the residue in the distillation flask. This is then distilled as described in Example 1. The yields of hexamethylene diamine and adipic acid are similar to those obtained when n-butanol is used.

Because of the greater solubility of isopropanol in aqueous solutions, it is desirable to reclaim this solvent from the crude adipic acid mother liquor by distillation of its aqueous azeotrope. If this is done about 93% of the isopropanol may be recovered.

What is claimed is:

1. A process for the recovery of constituent diamine and diacid from a synthetic fibre-forming polyamide obtained by condensing a diamine selected from the group consisting of aliphatic and aromatic diamines with a dicarboxylic acid selected from the group consisting of aliphatic and aromatic dicarboxylic acids, which comprises hydrolizing said polyamide under pressure in an inert atmosphere at a temperature between 160° C. and the temperature of decomposition in the presence of an aqueous solution containing at least 20% excess equivalents of an alkali metal hydroxide, extracting the diamine from the hydrolysis product with an organic solvent for said diamine capable of forming a two phase system when added to the hydrolysis product and having a boiling point sufficiently remote from that of the diamine to permit separation of said solvent from said diamine by distillation, said solvent being an alcohol selected from the group consisting of an aliphatic alcohol containing from 3 to 8 carbon atoms and a cycloaliphatic alcohol, and separating the solvent solution of diamine from the residual aqueous solution of diacid salt.

2. Process according to claim 1 wherein up to 100% excess equivalents of alkali are employed.

3. Process according to claim 1 when conducted at a pressure up to 15 atmospheres.

4. Process according to claim 1 wherein from about 0.1 to about 1 part of solvent is employed per part of hydrolysis product.

5. Process according to claim 1 wherein the organic solvent is utilized in admixture with water.

6. A process for the recovery of constituent diamine and diacid from a synthetic fibre-forming polyamide obtained by condensing a diamine selected from the group consisting of aliphatic and aromatic diamines with a dicarboxylic acid selected from the group consisting of aliphatic and aromatic dicarboxylic acids, which comprises hydrolizing said polyamide in an inert atmosphere under a superatmospheric pressure of up to 15 atmospheres and at a temperature within the range of 160 to 220° C. in the presence of an aqueous solution containing water and at least 20% excess equivalents of alkali metal hydroxide as the sole hydrolizing agents to form a solution containing the hydrolysis product of diamine and diacid, cooling the solution, extracting the hydrolysis product with about 0.1 to about 1 part of a solvent consisting of n-butanol in admixture with water to form a two phase system, and separating the solvent solution phase of diamine from the residual aqueous solution phase of diacid salt.

7. A process for the recovery of constituent diamine and diacid from a synthetic fibre-forming polyamide obtained by condensing a diamine selected from the group consisting of aliphatic and aromatic diamines with a dicarboxylic acid selected from the group consisting of aliphatic and aromatic dicarboxylic acids, which comprises hydrolizing said polyamide in an inert atmosphere under a superatmospheric pressure of up to 15 atmospheres and at a temperature within the range of 160 to 220° C. in the presence of an aqueous solution containing water and at least 20% excess equivalents of alkali metal hydroxide as the sole hydrolizing agents to form a solution containing the hydrolysis product of diamine and diacid, cooling the solution, extracting the hydrolysis product with from about 0.1 to about 1 part of a solvent consisting of isopropanol in admixture with water to form a two phase system, and separating the solvent solution phase of diamine from the residual aqueous solution phase of diacid salt.

8. A process for the recovery of constituent diamine and diacid from a synthetic fibre-forming polyamide obtained by condensing a diamine selected from the group consisting of aliphatic and aromatic diamines with a dicarboxylic acid selected from the group consisting of aliphatic and aromatic dicarboxylic acids, which comprises hydrolizing said polyamide in an inert atmosphere under a superatmospheric pressure of up to 15 atmospheres and at a temperature within the range of 160 to 220° C. in the presence of an aqueous solution containing water and at least 20% excess equivalents of alkali metal hydroxide as the sole hydrolizing agents to form a solution containing the hydrolysis product of diamine and diacid, cooling the solution, extracting the hydrolysis product with from about 0.1 to about 1 part of a solvent consisting of cyclohexanol in admixture with water to form a two phase system, and separating the solvent solution phase of diamine from the residual aqueous solution phase of diacid salt.

References Cited by the Examiner
UNITED STATES PATENTS 2,840,606  6/1958  Miller _____ 260—583

LORRAINE A. WEINBERGER, *Primary Examiner.*

LEON ZITVER, *Examiner.*